United States Patent
Wu et al.

(10) Patent No.: US 11,115,592 B2
(45) Date of Patent: Sep. 7, 2021

(54) METHOD AND DEVICE FOR STABILIZING PHOTOGRAPHIC EQUIPMENT ON MOBILE DEVICE

(71) Applicant: BOE TECHNOLOGY GROUP CO., LTD., Beijing (CN)

(72) Inventors: Ying Wu, Beijing (CN); Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 16/303,328

(22) PCT Filed: Mar. 5, 2018

(86) PCT No.: PCT/CN2018/078027
§ 371 (c)(1),
(2) Date: Nov. 20, 2018

(87) PCT Pub. No.: WO2019/001000
PCT Pub. Date: Jan. 3, 2019

(65) Prior Publication Data
US 2019/0246023 A1    Aug. 8, 2019

(30) Foreign Application Priority Data

Jun. 29, 2017 (CN) .......................... 201710514230.3

(51) Int. Cl.
*H04N 5/232* (2006.01)
*G03B 17/56* (2021.01)
(Continued)

(52) U.S. Cl.
CPC ......... *H04N 5/2328* (2013.01); *G03B 17/561* (2013.01); *G05B 11/42* (2013.01);
(Continued)

(58) Field of Classification Search
CPC ...... G03B 17/18; G02B 27/64; H04N 5/2328; H04N 5/23261; H04N 5/23251; H04N 5/23264
(Continued)

(56) References Cited

U.S. PATENT DOCUMENTS

| | | | |
|---|---|---|---|
| 2015/0365603 A1 | 12/2015 | Wahi et al. | |
| 2016/0198088 A1* | 7/2016 | Wang | H04N 5/2328 348/36 |

FOREIGN PATENT DOCUMENTS

| | | |
|---|---|---|
| CN | 2060537 U | 8/1990 |
| CN | 102588718 A | 7/2012 |

(Continued)

OTHER PUBLICATIONS

First Chinese Office Action dated Nov. 28, 2019.
(Continued)

*Primary Examiner* — Clayton E. LaBalle
*Assistant Examiner* — Fang-Chi Chang
(74) *Attorney, Agent, or Firm* — Dilworth & Barrese, LLP.; Michael J. Musella, Esq.

(57) ABSTRACT

A method and a device for stabilizing photographic equipment on a mobile device. The method includes: acquiring attitude information of the mobile device; determining an expected pitch angle of the photographic equipment; determining a driving force according to the expected pitch angle; and adjusting a pitch angle of the photographic equipment by adoption of the driving force.

18 Claims, 5 Drawing Sheets

(51) Int. Cl.
*G05B 11/42* (2006.01)
*G05D 1/00* (2006.01)
*G05D 1/08* (2006.01)
*G05D 3/20* (2006.01)
*B60R 11/00* (2006.01)
*B60R 1/12* (2006.01)
*B60R 11/04* (2006.01)
*B60R 1/04* (2006.01)

(52) U.S. Cl.
CPC ............... *G05D 1/00* (2013.01); *G05D 1/08* (2013.01); *G05D 3/20* (2013.01); *H04N 5/232* (2013.01); *H04N 5/23261* (2013.01); *B60R 1/04* (2013.01); *B60R 1/12* (2013.01); *B60R 11/04* (2013.01); *B60R 2001/1215* (2013.01); *B60R 2011/0085* (2013.01)

(58) Field of Classification Search
USPC .......................................................... 396/50
See application file for complete search history.

(56) References Cited

FOREIGN PATENT DOCUMENTS

| | | |
|---|---|---|
| CN | 202295294 U | 7/2012 |
| CN | 202660187 U | 1/2013 |
| CN | 103359001 A | 10/2013 |
| CN | 105045018 A | 11/2015 |
| CN | 105045293 A | 11/2015 |
| CN | 105116926 A | 12/2015 |
| CN | 204997688 U | 1/2016 |
| CN | 105522968 A | 4/2016 |
| CN | 105716584 A | 6/2016 |
| CN | 105933615 A | 9/2016 |
| CN | 205707401 U | 11/2016 |
| CN | 106716284 A | 5/2017 |
| CN | 106740539 A | 5/2017 |
| GB | 2517788 A | 3/2015 |
| JP | 09154057 A | 6/1997 |
| JP | H09154057 A | 6/1997 |
| JP | 2006060459 A | 3/2006 |
| JP | 2012156909 A | 8/2012 |

OTHER PUBLICATIONS

International Search Report and Written Opinion dated May 30, 2018 from State Intellectual Property Office of the P.R. China.
A Review of Recent Advances in Research and Development on Vehicle Semi_Active Suspension Systems Fang Zi-fan, etc; Journal of Chongqing University; Jan. 2003 vol. 26 No. 1; p. 104-108.
Master degree paper of Xi'An Technological University: Research on system of stability of Aerial platform image Based on gyroscopes Fang Xiao-ping, 2011 ljg.
Extended European Search Report from European Patent Application No. 18799421.5 dated Mar. 11, 2021.

* cited by examiner

METHOD AND DEVICE FOR STABILIZING PHOTOGRAPHIC EQUIPMENT ON MOBILE DEVICE

TECHNICAL FIELD

Embodiments of the present disclosure relate to a method and a device for stabilizing photographic equipment on a mobile device.

BACKGROUND

In order to stabilize a camera to achieve the technical objective of stable image acquisition, the methods used include: classic PID control, adaptive control, optimal control, fuzzy control, neural network control, etc.

SUMMARY

At least one embodiment of the present disclosure provides a method for stabilizing photographic equipment on a mobile device, comprising: acquiring attitude information of the mobile device; determining an expected pitch angle of the photographic equipment according to the attitude information of the mobile device; determining a driving force according to the expected pitch angle; and adjusting a pitch angle of the photographic equipment by adoption of the driving force.

For example, the mobile device includes a motor vehicle; the attitude information represents an attitude of the motor vehicle; and the attitude includes at least one selected from the group consisting of uphill, downhill, flat ground, being forward and being backward.

For example, determining the driving force according to the expected pitch angle includes: reading an initial pitch angle of the photographic equipment; calculating a number of adjustments according to the expected pitch angle and the initial pitch angle; and acquiring a sub-driving force of each adjustment according to the number of adjustments and the expected pitch angle.

For example, acquiring the sub-driving force of each adjustment according to the number of adjustments and the expected pitch angle includes: determining a sub-expected pitch angle of each adjustment according to a serial number of each adjustment; determining a current pitch angle of the photographic equipment; and calculating the sub-driving force of each adjustment according to the sub-expected pitch angle and the current pitch angle.

For example, calculating the sub-driving force of each adjustment according to the sub-expected pitch angle and the current pitch angle includes: calculating the sub-driving force according to $$X - Xd = -\frac{F + b\dot{X}}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; and F refers to the sub-driving force.

For example, calculating the sub-driving force of each adjustment according to the sub-expected pitch angle and the current pitch angle includes: acquiring an acceleration a of the mobile device in a vertical direction; and calculating the sub-driving force according to $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; F refers to the sub-driving force; and F(a) refers to a force generated by the acceleration a of the mobile device in the vertical direction on the photographic equipment.

For example, determining the current pitch angle of the photographic equipment includes: detecting current angular displacement and angular velocity information of the photographic equipment; and determining the current pitch angle according to the angular displacement and angular velocity information.

For example, determining the expected pitch angle of the photographic equipment according to the attitude information of the mobile device includes: determining the attitude of the mobile device according to the attitude information; and determining the expected pitch angle of the mobile device at the attitude according to a corresponding relation between the expected pitch angle and the attitude.

At least one embodiment of the present disclosure provide a device for stabilizing photographic equipment on a mobile device, comprising: a stabilizer, a controller, a driver and a sensor, wherein the stabilizer is configured to carry the photographic equipment; the sensor is configured to acquire the pitch angle of the stabilizer; the controller is configured to: acquire attitude information of the mobile device; determine an expected pitch angle of the photographic equipment according to the attitude information of the mobile device; and determine a driving force according to the expected pitch angle; and the driver is configured to adjust the pitch angle of the stabilizer according to the driving force.

For example, the stabilizer includes a tripod head which is configured to have single degree of freedom in a pitch direction.

For example, the driver includes a servo motor; and the controller includes a microcontroller unit (MCU).

For example, the controller is further configured to: read an initial pitch angle of the photographic equipment; calculate a number of adjustments according to the expected pitch angle and the initial pitch angle; and acquire a sub-driving force of each adjustment according to the number of adjustments and the expected pitch angle.

For example, the controller is further configured to: determine a sub-expected pitch angle of each adjustment according to a serial number of each adjustment; determine a current pitch angle of the photographic equipment; and calculate the sub-driving force of each adjustment according to the sub-expected pitch angle and the current pitch angle.

For example, the controller is further configured to: calculate the sub-driving force according to $$X - Xd = -\frac{F + b\dot{X}}{Kp},$$

in which X refers to the current pitch angle of the photographic equipment; Xd refers to the sub-expected pitch angle of the photographic equipment; b refers to the Coulomb friction coefficient; Ẋ refers to a current pitch angular velocity of the photographic equipment; Kp refers to the virtual stiffness factor; and F refers to the sub-driving force.

For example, the controller is further configured to: acquire an acceleration a of the mobile device in a vertical direction; and calculate the sub-driving force $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; Ẋ refers to a current pitch angular velocity of the photographic equipment; Kp refers to the virtual stiffness factor; a refers to the acceleration in the vertical direction; F refers to the sub-driving force; and F(a) refers to a force generated by the acceleration a of the mobile device in the vertical direction on the photographic equipment.

An embodiment of the present disclosure further provides a computer readable storage medium, wherein computer instructions are stored in the computer readable storage medium, and one or more of the following steps: acquiring attitude information of the mobile device; determining an expected pitch angle of the photographic equipment according to the attitude information of the mobile device; determining a driving force according to the expected pitch angle.

An embodiment of the present disclosure further provides an electronic product, comprising one or more processors, wherein the processor is configured to run the computer instructions so as to execute one or more of the following steps: acquiring attitude information of the mobile device; determining an expected pitch angle of the photographic equipment according to the attitude information of the mobile device; determining a driving force according to the expected pitch angle.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise specified, the technical terms or scientific terms used in the disclosure shall have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components.

There is a demand for image stabilization in a variety of application environments.

For example, aerial photography provides a relatively stable shooting environment for cameras through tripod heads.

For instance, as for a vehicle-mounted rearview mirror, the traditional rearview mirror has single function and narrow viewing angle, so there will be blind spots, which will bring certain safety hazards to car driving. The safety of driving can be ensured if the driver can effectively determine the following distance according to an image in the car's central rearview mirror (which can be a smart rearview mirror). The smart rearview mirror can capture the image of the car while driving in real time through a camera. As the camera has a wide viewing angle and can be mounted on the outside of a car, the problems of narrow viewing angle and blind spots of the traditional rearview mirror can be solved. During car driving, there will be certain bumps or ups and downs on the road surface, so the captured image received by the smart rearview mirror will be jittery and unstable, thus causing the misjudgment of the driver.

In the technology known to the inventors, tripod head is a feasible image stabilization unit and provides control of two to three degrees of freedom over a camera thereon, but a three-degree-of-freedom image stabilization unit such as the tripod head requires a control equation to be third-order dynamic equation which is used to control the stability of three aspects of a controlled object. For instance, the stability of the three aspects includes: pitch, yaw and roll, which makes the image stabilization control process and algorithm complicated.

The embodiment of the present disclosure provides a method for stabilizing photographic equipment on a mobile device, which simplifies the control equation of the system to be first-order dynamic equation considering that the working environment of the smart rearview mirror and the like only needs to ensure the stability of the pitch freedom. For instance, when applicable to the car, as for the degree of freedom in the pitch direction, feedback control may be made according to the acceleration of the car in the vertical direction transmitted by an external angular displacement sensor in combination with a CAN bus of the car, so as to effectively reduce the control cost and achieve the technical objective of image stabilization.

The method for stabilizing the photographic equipment on the mobile device, provided by the embodiment of the present disclosure, not only can be used for providing image data for the car-mounted smart rearview mirror but also can be applied in any single-degree-of-freedom pitch control field.

Figure 1:
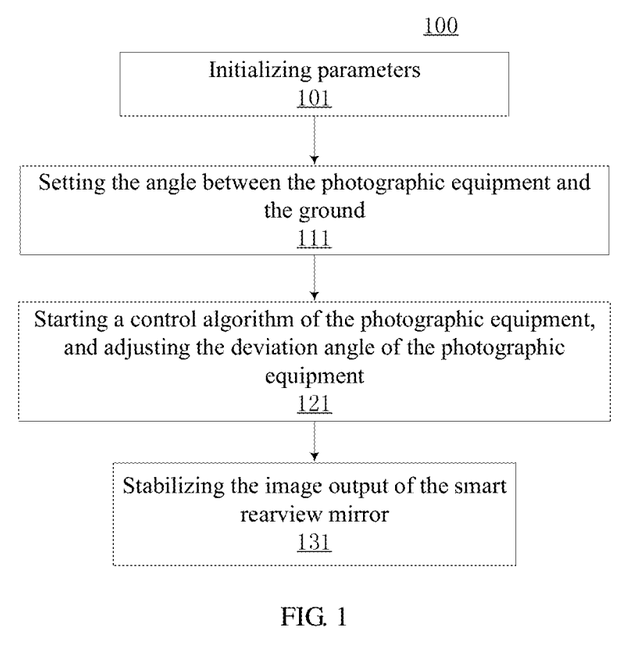
FIG. 1 is an application flowchart of a control method of photographic equipment, provided by one embodiment of the present disclosure.

As shown in FIG. 1, one embodiment of the present disclosure provides a method for stabilizing photographic equipment on a mobile device by taking the application on a smart rearview mirror as an example. The control flow 100 comprises:

S101: initializing parameters;

S111: setting the angle between the photographic equipment and the ground;

S121: starting a control algorithm of the photographic equipment, and adjusting the deviation angle of the photographic equipment (for instance, adjusting the pitch angle of the photographic equipment); and S131: stabilizing the image output of the smart rearview mirror based on the stable shooting of the photographic equipment.

In some embodiments, the parameter initialization in the step S101 can realize the initialization of the working state of relevant equipment, for instance, including camera initialization, smart rearview mirror initialization, etc.

In some embodiments, the smart rearview mirror is disposed in the car, and in the step S111, the angle between the photographic equipment and the ground is set by calculation on the basis of acquired attitude data of the car. The angle set in the step is the initial angle between the photographic equipment and the ground. The initial angle can be updated in real time according to the attitude data during car driving.

Figure 2:
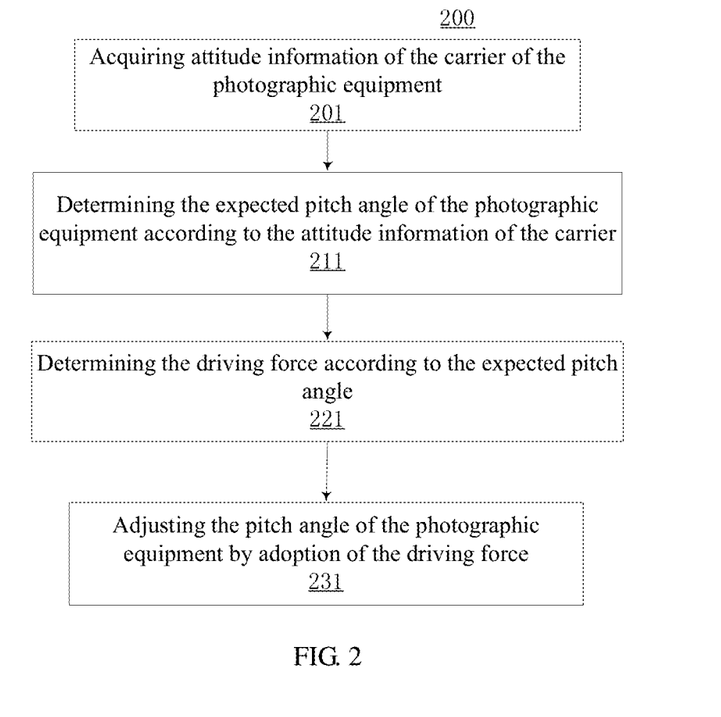
FIG. 2 is a flowchart of a method for stabilizing photographic equipment on a mobile device, provided by one embodiment of the present disclosure.

In some embodiments, the start of the control algorithm of the photographic equipment in the step S121 refers to the start of the flow processes (for instance, as shown in FIG. 2) of the method for stabilizing the photographic equipment on the mobile device. The pitch angle of the photographic equipment is adjusted based on the control algorithm, until the pitch angle between the photographic equipment and the ground can reach the expected pitch angle.

For instance, the expected pitch angle of the car in a variety of attitudes may be respectively acquired by adoption of pre-statistical mode, and the expected pitch angle may allow the photographic equipment to capture space images behind the car at the widest possible range.

For instance, the corresponding relation between the pre-statistical expected pitch angle and the attitude information may be stored as a correspondence table. When used, the expected pitch angle corresponding to the attitude information is acquired by inquiring the correspondence table.

For instance, the expected pitch angle corresponding to the attitude information may also be obtained by calculation. For instance, a neutral network including a relation model of the expected pitch angle and the attitude information may be obtained on the basis of machine learning, and after the training is completed, the attitude information is inputted into the neutral network to obtain the expected pitch angle.

In some embodiments, in the step S121, a plurality of adjustment cycles are adopted to finally adjust the pitch angle of the photographic equipment to be the expected pitch angle corresponding to the driving attitude of the car.

In some embodiments, the control algorithm in the step S121 may be based on PID control. The closed-loop automatic control technology of PID control is based on the concept of feedback to reduce uncertainty. The elements of feedback theory include three parts: measurement, comparison, and execution. The key to the measurement is to compare the actual value of a controlled variable (corresponding to the current pitch angle in the subsequent embodiment of the present disclosure) with the expected value (corresponding to the expected pitch angle in the subsequent embodiment of the present disclosure; the expected pitch angle corresponds to a plurality of sub-expected pitch angles when a plurality of adjustment cycles are adopted), and use the deviation (namely the difference between the current pitch angle and the sub-expected pitch angle in the subsequent embodiment of the present disclosure) to correct the response of the system (namely acquiring the driving force of this adjustment in the subsequent embodiment of the present disclosure) and perform adjustment control (namely adjusting the pitch angle of the photographic equipment according to the acquired driving force in the subsequent embodiment of the present disclosure). In engineering practice, the most widely used PID regulator control law is proportional, integral and differential control, referred to as PID control, also known as PID adjustment.

Although description has been given above to the case that PID control may be adopted to realize the control algorithm in the step S121, other control methods such as long and short time memory (LSTM) neural network controller and fuzzy controller may also be applied to the technical solution of the embodiment of the present disclosure.

In some embodiments, in the step S131, the image output of the smart rearview mirror is stabilized on the basis of the stable shooting of the photographic equipment, that is, after the pitch angle is obtained by adoption of PID control to adjust the photographic equipment, corresponding image is taken by the photographing equipment, and the photographed image is transmitted to the smart rearview mirror for display. For instance, the photographic equipment may adopt wired or wireless means to transmit the photographed image to the smart rearview mirror. For instance, an internal CAN bus may be adopted to transmit photographed image data to the smart rearview mirror, or short-range wireless communication technology such as Bluetooth may also be adopted to transmit the image data to the smart rearview mirror.

Of course, the control method as shown in FIG. 1 is not limited to be applied to the car and may also be applied to other mobile devices (e.g., motorcycles, electric motor cars, bicycles, airplanes or ships). No limitation will be given here in the present disclosure. The mobile device referred to in the present disclosure may broadly include a movable carrier.

As shown in FIG. 2, the embodiment of the present disclosure provides a method 200 for stabilizing photographic equipment on a mobile device. The method 200 for stabilizing the photographic equipment on the mobile device may be applied to a car and may also be applied to other movable mobile devices. The photographic equipment may be a camera, an infrared camera, a depth camera or a camera of other types. No limitation will be given here in the present disclosure.

The method 200 for stabilizing the photographic equipment on the mobile device may comprise:

S201: acquiring attitude information of the mobile device;

S211: determining the expected pitch angle of the photographic equipment according to the attitude information of the mobile device;

S221: determining the driving force according to the expected pitch angle; and

S231: adjusting the pitch angle of the photographic equipment by adoption of the driving force.

In some embodiments, the photographic equipment in the step S201 may be a camera, and the mobile device may be a car, etc. Corresponding attitude information may be the acceleration of the car in the vertical direction, or whether the car is uphill or downhill (the attitude information also includes the approximate situation of the slope when the car is downhill or uphill, e.g., the angle of inclination of the slope), or the attitude information here may be forward or backward information of the car.

For instance, the mobile device includes a motor vehicle; and the attitude information represents the attitude of the motor vehicle, including at least one of uphill, downhill, flat ground, forward or backward.

In some embodiments, the step of determining the driving force according to the expected pitch angle may include: reading the initial pitch angle of the photographic equipment; calculating the number of adjustments according to the expected pitch angle and the initial pitch angle; and acquiring the sub-driving force of each adjustment according to the number of adjustments and the expected pitch angle. For instance, the initial pitch angle may be the pitch angle set in the process of initializing the photographic equipment, and may also be the current pitch angle measured by an angular velocity sensor.

For instance, the pitch angle may be an angle between the photographic equipment and the level ground.

In some embodiments, if the angle range to be adjusted is small, that is, the difference between the current pitch angle and the expected pitch angle is small, the process can be finished by one adjustment.

In some embodiments, multiple adjustments of the current pitch angle are required to adjust the angle between the photographic equipment and the level ground to be the expected pitch angle. At this point, the step of determining the driving force according to the expected pitch angle in S221, for instance, may include: reading the initial pitch angle of the photographic equipment; calculating the number of adjustments according to the expected pitch angle and the initial pitch angle; and acquiring the sub-driving force of each adjustment according to the number of adjustments and the expected pitch angle.

For instance, the number of adjustments is calculated according to the maximum intersection angle in each control cycle, the initial pitch angle and the expected pitch angle, and the sub-expected pitch angle desired for each adjustment is obtained.

In some embodiments, the step of acquiring the sub-driving force of each adjustment according to the number of adjustments and the expected pitch angle may include: determining the sub-expected pitch angle of each adjustment according to the serial number of each adjustment; determining the current pitch angle of the photographic equipment; and calculating the sub-driving force of each adjustment according to the sub-expected pitch angle and the current pitch angle.

For instance, the serial number may be corresponding number of adjustments recorded in each control cycle. When the pitch angle is adjusted in the first control cycle, the serial number is 1; and when the pitch angle is adjusted in the second control cycle, the serial number is 2. Thus, the sub-expected pitch angle corresponding to each control cycle may be determined according to the serial number. Moreover, for instance, the pitch angle of the photographic equipment is measured by an angular sensor on the basis of the control cycle. For instance, the pitch angle at the current moment may be measured at the end of this control cycle and taken as the current pitch angle of the photographic equipment.

In some embodiments, if the road surface on which the mobile device travels is relatively flat and there is no obvious bump, the sub-driving force of each adjustment may be calculated according to the sub-expected pitch angle and the current pitch angle.

For instance, the computing formula of the sub-driving force may be: calculating the sub-driving force according to $$X - Xd = -\frac{F + b\dot{X}}{Kp},$$

in which X refers to the current pitch angle of the photographic equipment; Xd refers to the sub-expected pitch angle of the photographic equipment in the case of adjustment by multiple control cycles; b refers to the Coulomb friction coefficient; $\dot{X}$ refers to the current pitch angular velocity of the photographic equipment; Kp refers to the virtual stiffness factor; and F refers to the sub-driving force.

In some embodiments, if the road surface on which the car travels is bumpy, the sub-driving force can be finally determined according to the acceleration a of the mobile device in the vertical direction. For instance, the step of calculating the sub-driving force of each adjustment according to the sub-expected pitch angle and the current pitch angle includes: acquiring the acceleration a of the mobile device in the vertical direction; and calculating the sub-driving force according to $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; $\dot{X}$ refers to the current pitch angular velocity of the photographic equipment; Kp refers to the virtual stiffness factor; F refers to the sub-driving force; and F(a) refers to the force generated by the acceleration a of the mobile device in the vertical direction on the photographic equipment. For instance, the acceleration a of the car in the vertical direction may be obtained from the CAN bus of the car.

For instance, the sub-expected pitch angle is obtained according to the expected pitch angle corresponding to the attitude. For instance, the angle range required to be adjusted may be calculated according to the expected pitch angle and the initial pitch angle; subsequently, the angle range is divided by the maximum angle that can be adjusted in the control cycle to obtain each adjusting angle; and finally, the sub-expected pitch angle of this adjustment is calculated according to this adjusting angle and corresponding number of adjustments and the initial pitch angle.

In some embodiments, the parameter F(a) in the above formula can be obtained by the fitting of the results of actual engineering measurements (that is, numerical solution can be used to approximate corresponding relation equation). A relevant device may also be mounted on the photographic equipment to measure the force generated by the photographic equipment at the acceleration a. Or the parameter may be obtained by calculation through $F(a)=ma$, in which m refers to the mass of the photographic equipment.

In some embodiments, the step of determining the expected pitch angle of the photographic equipment according to the attitude information of the mobile device in S211 may include: determining the attitude of the mobile device according to the attitude information; and determining the expected pitch angle of the mobile device at the attitude according to the corresponding relation between the expected pitch angle and the attitude.

For instance, the sub-expected pitch angle corresponding to each control cycle is calculated according to the determined pitch angle at the attitude. The sub-expected pitch angle is relevant to the maximum angle of the motor that can be adjusted in the current control cycle. The expected pitch angle is relevant to the attitude of the car.

For instance, the photographic equipment is a camera. The initial pitch angle of the camera is 30°; the expected pitch angle of the car at the current attitude, obtained according to the attitude data of the car, is 40°; and the control cycle of each adjustment is 100 ms. According to the motor performance, the maximum intersection angle increment of the camera in one control cycle is 0.5°, so the obtained number of control steps is 20 (namely)(40°−30°/ 0.5°=20), and the 20 here is the obtained number of adjustments. The sub-expected pitch angles obtained after subdivision are respectively: 30.5°, 31°, 31.5°, 32°, 32.5°, 33° . . . 40°.

In each adjustment, the sub-expected pitch angle corresponding to this adjustment, obtained after subdivision, is taken as the target pitch angle of this adjustment. For instance, when the serial number is 3, the sub-expected pitch angle is 31.5°, namely the target pitch angle of the current motor in the third control cycle is 31.5°, and the pitch angle of the current camera acquired by the angle sensor is marked as angle_real. A deviation angle is obtained by subtracting the sub-expected pitch angle and the current pitch angle, and then the deviation angle is inputted into a controller. The sub-driving force required for rotating the photographic equipment to the position of the sub-expected pitch angle may be obtained according to the force and displacement conversion algorithm (the computing formulas of two forces as described below) on the basis of the deviation angle. The sub-driving force drives the photographic equipment to move to corresponding position of the sub-expected pitch angle. The angle between the photographic equipment and the level ground can be rotated to 40° after repeating the example for 20 times, that is, the photographic equipment can be basically rotated to the expected pitch angle 40° after 20 adjustments.

In some embodiments, the step of determining the current pitch angle of the photographic equipment may include: detecting the current angular displacement and angular velocity information of the photographic equipment; and determining the current pitch angle according to the angular displacement and angular velocity information.

Figure 3A:
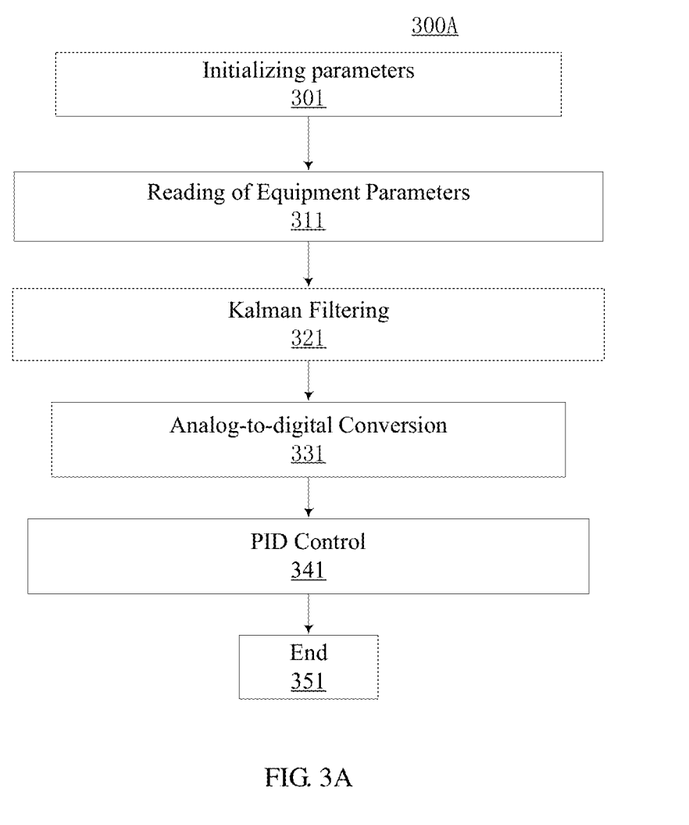
FIG. 3A is a flowchart of a method for stabilizing photographic equipment on a mobile device, provided by another embodiment of the present disclosure.

As shown in FIG. 3A which is a schematic diagram illustrating the process of adjusting the pitch angle in some embodiments of the present disclosure, the process of adjusting the pitch angle may include: S301: parameter initialization; S311: reading of equipment parameters; S321: Kalman filtering; S331: analog-to-digital conversion; S341: PID control; and S351: end of pitch angle adjustment.

For instance, the parameter initialization includes the initialization of the mobile device (e.g., the car), the photographic equipment, etc. The reading of the equipment parameters includes: reading attitude data information of the car, reading the initial pitch angle of the photographic equipment, etc.

For instance, in the step S321, information relevant to the acquired pitch angle is subjected to Kalman filtering, and then the current pitch angle of the photographic equipment is obtained; the obtained current pitch angle is subjected to analog-to-digital conversion; and a digital signal obtained after conversion is taken as an input signal of PID control.

For instance, the PID control in the step S341 may produce a driving force according to the input expected pitch angle and the feedback or acquired current pitch angle. Subsequently, the driving force is adopted to drive the motor to adjust the pitch angle of the photographic equipment. Moreover, for instance, after the end of this control cycle, the angular displacement offset (namely the difference between the pitch angle after this adjustment and the expected pitch angle) is calculated. If the angular displacement offset is greater than a certain threshold, at least one control cycle must be started again for adjustment. If the angular displacement offset is less than or equal to the set threshold, the adjustment of the pitch angle of the photographic equipment is ended.

Figure 3B:
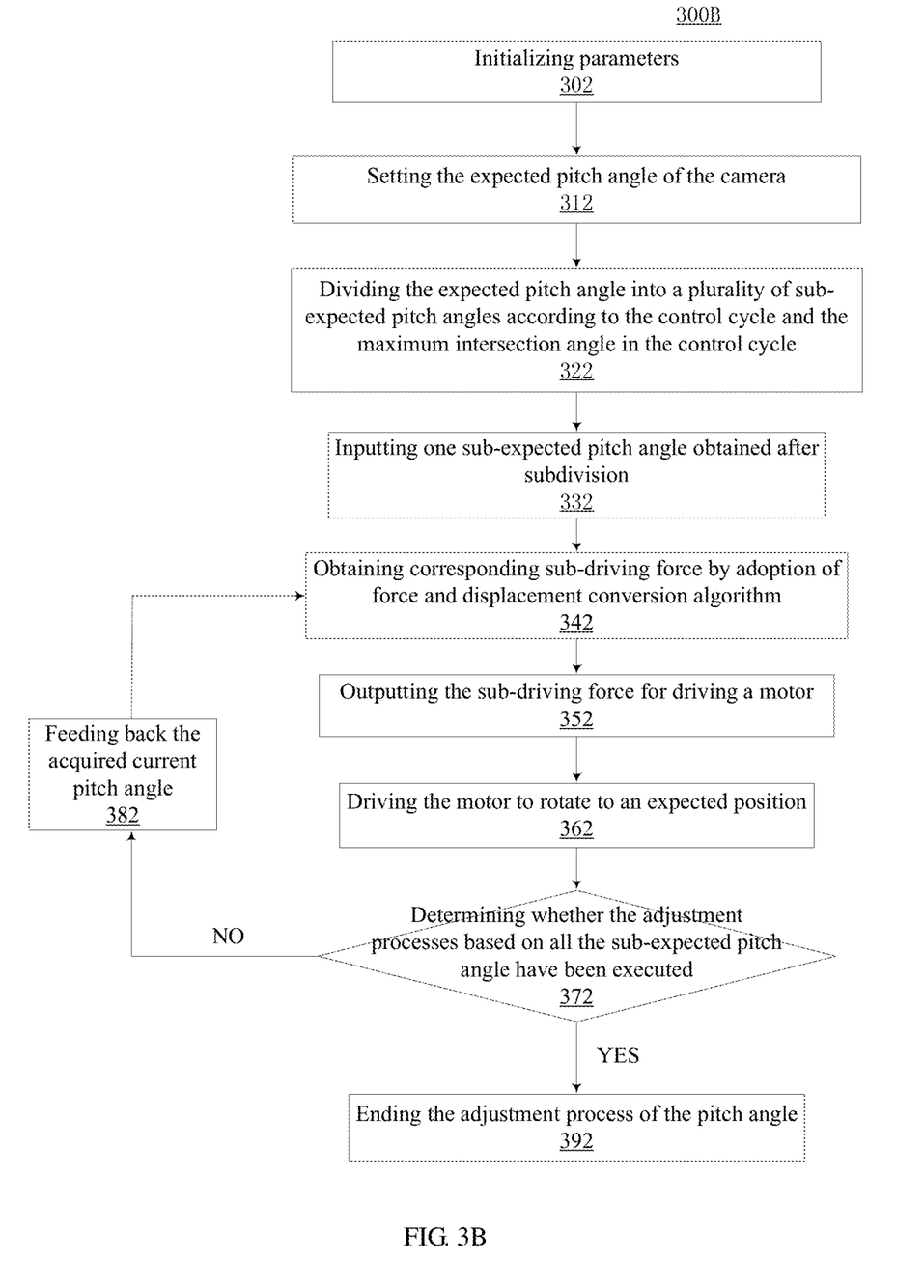
FIG. 3B is a flowchart of a method for stabilizing photographic equipment on a mobile device, provided by still another embodiment of the present disclosure.

FIG. 3B is a flowchart illustrating the process of adjusting the pitch angle of the camera by adoption of multiple control cycles in some embodiments of the present disclosure. For instance, the process of adjusting the pitch angle of the camera by adoption of multiple control cycles may include: S302: initializing parameters; S312: setting the expected pitch angle of the camera; S322: dividing the expected pitch angle into a plurality of sub-expected pitch angles according to the control cycle and the maximum intersection angle in the control cycle; S332: inputting one sub-expected pitch angle obtained after subdivision; S342: obtaining corresponding sub-driving force by adoption of force and displacement conversion algorithm; S352: outputting the sub-driving force for driving a motor; S362: driving the motor to rotate to an expected position; S372: determining whether the adjustment processes based on all the sub-expected pitch angle have been executed, executing the step S392 if the adjustment processes of all the sub-expected pitch angles have been executed, and executing the step S382 if not; S382: feeding back the acquired current pitch angle, and returning to the step S342; and S392: ending the adjustment process of the pitch angle.

For instance, the process of dividing the expected pitch angle into the plurality of pitch angles in the step S322 may refer to the method provided by the above embodiment. The sequentially obtained sub-expected pitch angles will be inputted in the step S332 until the step S342 is executed, and then corresponding sub-driving force will be obtained in the step S342 according to one of the above computing formulas of the two sub-driving forces on the basis of the input sub-expected pitch angle and the current expected pitch angle of the photographic equipment obtained by feedback. The driver is driven by the sub-driving force in the step S362. Whether the adjustment processes of all the sub-expected pitch angles have been executed will be determined according to the set serial number in the step S372. For instance, a flag is set to store the serial number, and the serial number stored on the flag will be automatically added by one after the angle adjustment of one control cycle is executed. The number of cycles is the same with the number of the sub-expected pitch angles. For instance, in the above step S382, the current pitch angle data may be acquired by adoption of an angular displacement sensor.

Figure 4:
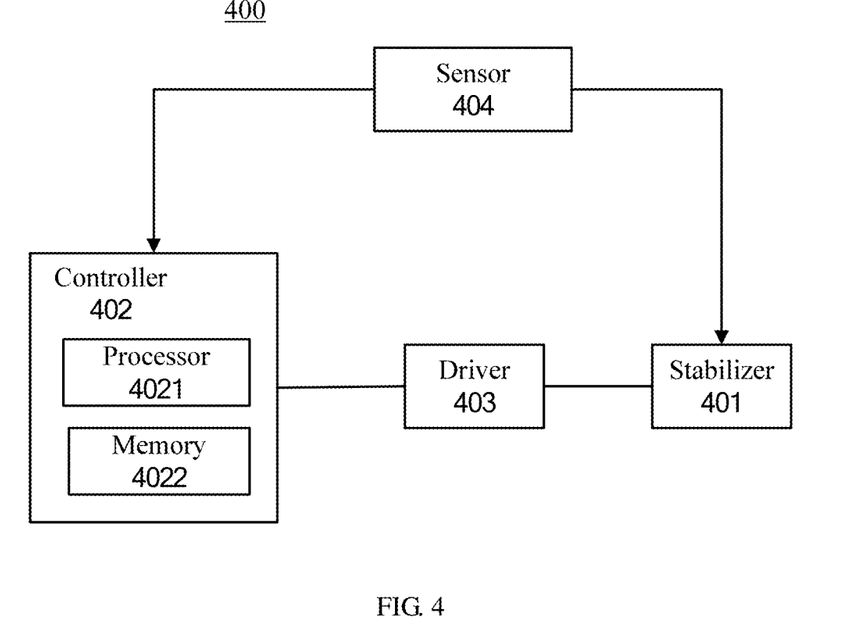
FIG. 4 is a block diagram of a device for stabilizing photographic equipment on a mobile device, provided by one embodiment of the present disclosure.

FIG. 4 illustrates a device 400 for stabilizing photographic equipment on a mobile device, provided by at least one embodiment of the present disclosure. The device 400 for stabilizing the photographic equipment on the mobile device may comprise: a stabilizer 401, a controller 402, a driver 403 and a sensor 404. The photographic equipment is placed on the stabilizer 401. The sensor 404 acquires the pitch angle of the stabilizer 401. The controller 402 is configured to: acquire attitude information of the mobile device; determine the expected pitch angle of the photographic equipment according to the attitude information of the mobile device; and determine the driving force according to the expected pitch angle. The driver 403 is configured to adjust the pitch angle of the stabilizer 401 according to the driving force.

In some embodiments, the pitch angle of the stabilizer 401 is taken as the pitch angle of the photographic equipment. This is merely for the convenience of describing the technical proposal, and it can be deduced that when the photographic equipment is not placed in parallel on corresponding plane of the stabilizer 401 but the placing orientations of both are relatively fixed, in order to obtain the pitch angle of the photographic equipment according to the pitch angle of the stabilizer, angle conversion is required so that the pitch angle of the photographic equipment can be finally obtained according to the angle of the stabilizer 401. However, the pitch angle of the photographic equipment obtained on the basis of the conventional mathematical conversion shall also fall within the scope of protection of the embodiment of the present disclosure.

For instance, the sensor 404 may be mounted on the stabilizer 401, so that the angular displacement sensor can measure the pitch angle of the stabilizer 401. Moreover, for instance, the sensor 404 may be a gyroscope.

In some embodiments, the stabilizer 401 may be a single-degree-of-freedom camera stabilization mechanism. For instance, the stabilizer 401 is a tripod head, in which the tripod head is configured to have single degree of freedom in the pitch direction.

In some embodiments, the controller 402 includes one or more processors 4021. For instance, the processor may be a microcontroller unit (MCU). For instance, the controller may be connected with the driver 403 through an output port of the MCU. Moreover, for instance, the minimum system of the MCU adopts ATmega16 MCU, and its minimum system circuit includes an external clock circuit, a reset circuit, an ISP port of a USBASP download line, etc.

In some embodiments, the processor may also be a central processing unit (CPU), a field programmable gate array (FPGA), an application-specific integrated circuit (ASIC), a digital signal processor (DSP), etc.

In some embodiments, the processor is further connected with a memory 4022, and computer instructions are stored in the memory 4022.

In some embodiments, the driver 403 may be a motor such as a stepper motor or a servo motor. The servo motor may be an AC motor and may also be a DC motor. Based on the motor type, direct current supply or alternating current supply is correspondingly adopted to supply power for the driver 403.

For instance, the driver 403 may adopt a steering gear.

In some embodiments, the controller 402 is further configured to: read the initial pitch angle of the photographic equipment; calculate the number of adjustments according to the expected pitch angle and the initial pitch angle; and acquire the sub-driving force of each adjustment according to the number of adjustments, the expected pitch angle and the acceleration information.

For instance, the controller 402 adopts wired or wireless means to receive a pitch angle signal, relevant to the photographic equipment, acquired by the angular displacement sensor 404. The controller 402 may perform filtering in the process of reading the pitch angle signal.

In some embodiments, the controller 402 is further configured to: determine the sub-expected pitch angle of each adjustment according to the serial number of each adjustment; determine the current pitch angle of the photographic equipment; and calculate the sub-driving force of each adjustment according to the sub-expected pitch angle, the current pitch angle and the acceleration information.

In some embodiments, the controller 402 is further configured to: calculate the sub-driving force according to $$X - Xd = -\frac{F + b\dot{X}}{Kp},$$

in which X refers to the current pitch angle of the photographic equipment; Xd refers to the sub-expected pitch angle of the photographic equipment; b refers to the Coulomb friction coefficient; $\dot{X}$ refers to the current pitch angular velocity of the photographic equipment; Kp refers to the virtual stiffness factor; and F refers to the sub-driving force.

In some embodiments, the controller 402 is further configured to: acquire the acceleration a of the mobile device in the vertical direction; and calculate the sub-driving force according to $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; $\dot{X}$ refers to the current pitch angular velocity of the photographic equipment; Kp refers to the virtual stiffness factor; a refers to the acceleration in the vertical direction; F refers to the sub-driving force; and F(a) refers to the force generated by the acceleration a of the mobile device in the vertical direction on the photographic equipment.

In some embodiments, the parameter F(a) in the above formula must be obtained by the fitting of the results of actual engineering measurements (that is, numerical solution can be used to approximate corresponding relation equation). A relevant device may also be mounted on the photographic equipment to measure the force generated by the photographic equipment at the acceleration a. Or the parameter may be obtained by calculation through F(a)=ma, in which m refers to the mass of the photographic equipment.

Figure 5A:
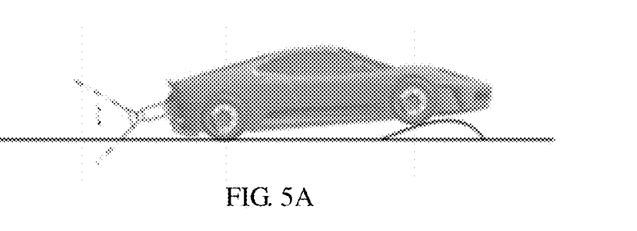
FIGS. 5A and 5B are comparison diagrams illustrating the difference in shooting range of the photographic equipment before and after the adoption of the device for stabilizing the photographic equipment on the mobile device provided by one embodiment of the present disclosure.
Figure 5B:
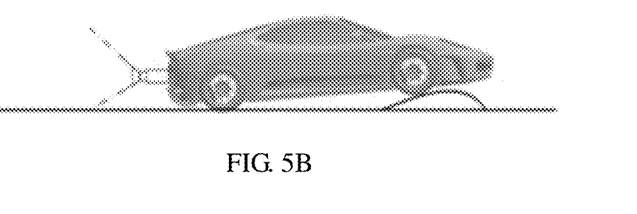

FIGS. 5A and 5B are comparison diagrams illustrating the difference in shooting range of the photographic equipment before and after the adoption of the device for stabilizing the photographic equipment on the mobile device provided by one embodiment of the present disclosure. FIG. 5A is a schematic diagram illustrating the shooting range of a camera not adopting the angle adjustment method provided by the present disclosure, and as can be seen from the figure, as the pitch angle between the camera and the ground is not adjusted in time, the shooting range of the photographic equipment is limited. As shown in FIG. 5B, after the pitch angle adjustment in the embodiment of the present disclosure, the shooting range of the camera has increased a lot.

The control method of camera stabilization provided by the embodiment of the present disclosure simplifies the complex multiple-degree-of-freedom control system according to the characteristic that, during car driving, an image outputted by a smart rearview mirror has high requirement on the stabilization in the pitch direction and has low requirement on the stabilization in the roll and yaw directions. The single-degree-of-freedom control method adopting PID control achieves good effect of stable image output.

For instance, the cost can be greatly reduced by adopting the acceleration in the vertical direction, provided by the angular displacement sensor in combination with the CAN bus of the car, as feedback input of the controller. That is to say, the embodiment of the present disclosure can actively adjust the camera angle to reach reasonable rearview range according to the driver's viewing angle requirement on the smart rearview mirror.

The embodiment of the present disclosure further provides a computer readable storage medium, and computer instructions are stored thereon. When the computer instructions are executed by a processor, one or more steps of the following operations are executed: acquiring attitude information of the mobile device; determining the expected pitch angle of the photographic equipment according to the attitude information of the mobile device; and determining the driving force according to the expected pitch angle.

The embodiment of the present disclosure further provides an electronic product, which comprises one or more processors. The processor is configured to run the computer instructions so as to execute one or more steps of the following operations: acquiring attitude information of the mobile device; determining the expected pitch angle of the photographic equipment according to the attitude information of the mobile device; and determining the driving force according to the expected pitch angle.

For instance, the computer readable storage medium may be implemented by any of a variety of volatile or nonvolatile storage devices, or a combination thereof, e.g., a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

For instance, the processor may be a logical computing device having data processing capability and/or program execution capability such as a CPU, an FPGA, an MCU, a DSP or an ASIC.

For instance, the computer instructions include one or more processor operations defined by an instruction set architecture corresponding to the processor. These computer instructions may be logically included and represented by one or more computer programs.

The accompanying drawings in the embodiment of the present disclosure only involve the structures relevant to the embodiments of the present disclosure, and other structures may refer to the conventional design. The embodiments of the present disclosure and the characteristics in the embodiments may be mutually combined without conflict.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201710514230.3, filed Jun. 29, 2017, the disclosure of which is incorporated herein by reference as part of the application.

The invention claimed is:

1. A method for stabilizing photographic equipment on a mobile device, comprising:
   acquiring attitude information of the mobile device;
   determining an expected pitch angle of the photographic equipment according to the attitude information of the mobile device;
   determining a driving force according to the expected pitch angle; and
   adjusting a pitch angle of the photographic equipment by adoption of the driving force,
   wherein determining the driving force according to the expected pitch angle includes:
      reading an initial pitch angle of the photographic equipment;
      calculating a number of adjustments according to the expected pitch angle and the initial pitch angle; and
      acquiring a sub-driving force of each adjustment according to the number of adjustments and the expected pitch angle,
   acquiring the sub-driving force of each adjustment according to the number of adjustments and the expected pitch angle includes:
      determining a sub-expected pitch angle of each adjustment according to a serial number of each adjustment;
      determining a current pitch angle of the photographic equipment; and
      calculating the sub-driving force of each adjustment according to the sub-expected pitch angle and the current pitch angle,
   wherein calculating the sub-driving force of each adjustment according to the sub-expected pitch angle and the current pitch angle includes:
      calculating the sub-driving force according to $$X - Xd = -\frac{F + b\dot{X}}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; and F refers to the sub-driving force.

2. The method for stabilizing the photographic equipment on the mobile device according to claim 1, wherein
   the mobile device includes a motor vehicle;
   the attitude information represents an attitude of the motor vehicle; and the attitude includes at least one selected from the group consisting of uphill, downhill, flat ground, being forward and being backward.

3. The method for stabilizing the photographic equipment on the mobile device according to claim 1, wherein determining the current pitch angle of the photographic equipment includes:
   detecting current angular displacement and angular velocity information of the photographic equipment; and
   determining the current pitch angle according to the angular displacement and angular velocity information.

4. The method for stabilizing the photographic equipment on the mobile device according to claim 1, wherein determining the expected pitch angle of the photographic equipment according to the attitude information of the mobile device includes:
   determining the attitude of the mobile device according to the attitude information; and
   determining the expected pitch angle of the mobile device at the attitude according to a corresponding relation between the expected pitch angle and the attitude.

5. A computer readable storage medium, wherein computer instructions are stored in the computer readable storage medium, and one or more steps of the method according to claim 1 are implemented when the computer instructions are executed by a processor.

6. An electronic product, comprising one or more processors, wherein the processor is configured to run the computer instructions so as to execute one or more steps of the method according to claim 1.

7. A method for stabilizing photographic equipment on a mobile device, comprising:
   acquiring attitude information of the mobile device;
   determining an expected pitch angle of the photographic equipment according to the attitude information of the mobile device;
   determining a driving force according to the expected pitch angle; and
   adjusting a pitch angle of the photographic equipment by adoption of the driving force,
   wherein determining the driving force according to the expected pitch angle includes:
      reading an initial pitch angle of the photographic equipment;
      calculating a number of adjustments according to the expected pitch angle and the initial pitch angle; and
      acquiring a sub-driving force of each adjustment according to the number of adjustments and the expected pitch angle,
   acquiring the sub-driving force of each adjustment according to the number of adjustments and the expected pitch angle includes:
      determining a sub-expected pitch angle of each adjustment according to a serial number of each adjustment;
      determining a current pitch angle of the photographic equipment; and
      calculating the sub-driving force of each adjustment according to the sub-expected pitch angle and the current pitch angle, wherein calculating the sub-driving force of each adjustment according to the sub-expected pitch angle and the current pitch angle includes:
         acquiring an acceleration a of the mobile device in a vertical direction; and
         calculating the sub-driving force according to $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; F refers to the sub-driving force; and F(a) refers to a force generated by the acceleration a of the mobile device in the vertical direction on the photographic equipment.

8. The method for stabilizing the photographic equipment on the mobile device according to claim 7, wherein
   the mobile device includes a motor vehicle;
   the attitude information represents an attitude of the motor vehicle; and the attitude includes at least one selected from the group consisting of uphill, downhill, flat ground, being forward and being backward.

9. The method for stabilizing the photographic equipment on the mobile device according to claim 7, wherein determining the current pitch angle of the photographic equipment includes:
   detecting current angular displacement and angular velocity information of the photographic equipment; and
   determining the current pitch angle according to the angular displacement and angular velocity information.

10. The method for stabilizing the photographic equipment on the mobile device according to claim 7 wherein determining the expected pitch angle of the photographic equipment according to the attitude information of the mobile device includes:
    determining the attitude of the mobile device according to the attitude information; and
    determining the expected pitch angle of the mobile device at the attitude according to a corresponding relation between the expected pitch angle and the attitude.

11. A computer readable storage medium, wherein computer instructions are stored in the computer readable storage medium, and one or more steps of the method according to claim 7 are implemented when the computer instructions are executed by a processor.

12. An electronic product, comprising one or more processors, wherein the processor is configured to run the computer instructions so as to execute one or more steps of the method according to claim 7.

13. A device for stabilizing photographic equipment on a mobile device, comprising: a stabilizer, a controller, a driver and a sensor, wherein
    the stabilizer is configured to carry the photographic equipment;
    the sensor is configured to acquire the pitch angle of the stabilizer;
    the controller is configured to:
       acquire attitude information of the mobile device;
       determine an expected pitch angle of the photographic equipment according to the attitude information of the mobile device; and
       determine a driving force according to the expected pitch angle; and
    the driver is configured to adjust the pitch angle of the stabilizer according to the driving force,
    the controller is further configured to:
       read an initial pitch angle of the photographic equipment;
       calculate a number of adjustments according to the expected pitch angle and the initial pitch angle; and
       acquire a sub-driving force of each adjustment according to the number of adjustments and the expected pitch angle, the controller is further configured to:
  determine a sub-expected pitch angle of each adjustment according to a serial number of each adjustment;
  determine a current pitch angle of the photographic equipment; and
  calculate the sub-driving force of each adjustment according to the sub-expected pitch angle and the current pitch angle,
wherein the controller is further configured to:
  calculate the sub-driving force according to $$X - Xd = -\frac{F + b\dot{X}}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; and F refers to the sub-driving force.

14. The device for stabilizing the photographic equipment on the mobile device according to claim 13, wherein the stabilizer includes a tripod head which is configured to have single degree of freedom in a pitch direction.

15. The device for stabilizing the photographic equipment on the mobile device according to claim 13, wherein the driver includes a servo motor; and the controller includes a microcontroller unit (MCU).

16. A device for stabilizing photographic equipment on a mobile device, comprising: a stabilizer, a controller, a driver and a sensor, wherein
  the stabilizer is configured to carry the photographic equipment;
  the sensor is configured to acquire the pitch angle of the stabilizer;
  the controller is configured to:
    acquire attitude information of the mobile device;
    determine an expected pitch angle of the photographic equipment according to the attitude information of the mobile device; and
    determine a driving force according to the expected pitch angle; and
  the driver is configured to adjust the pitch angle of the stabilizer according to the driving force the controller is further configured to:
  read an initial pitch angle of the photographic equipment;
  calculate a number of adjustments according to the expected pitch angle and the initial pitch angle; and
  acquire a sub-driving force of each adjustment according to the number of adjustments and the expected pitch angle,
the controller is further configured to:
  determine a sub-expected pitch angle of each adjustment according to a serial number of each adjustment;
  determine a current pitch angle of the photographic equipment; and
  calculate the sub-driving force of each adjustment according to the sub-expected pitch angle and the current pitch angle, wherein the controller is further configured to:
  acquire an acceleration a of the mobile device in a vertical direction; and
  calculate the sub-driving force $$X - Xd = -\frac{F + b\dot{X} + F(a)}{Kp},$$

in which X refers to the current pitch angle of the photographic equipment; Xd refers to the sub-expected pitch angle of the photographic equipment; b refers to the Coulomb friction coefficient; $\dot{X}$ refers to a current pitch angular velocity of the photographic equipment; Kp refers to the virtual stiffness factor; a refers to the acceleration in the vertical direction; F refers to the sub-driving force; and F(a) refers to a force generated by the acceleration a of the mobile device in the vertical direction on the photographic equipment.

17. The device for stabilizing the photographic equipment on the mobile device according to claim 16, wherein the stabilizer includes a tripod head which is configured to have single degree of freedom in a pitch direction.

18. The device for stabilizing the photographic equipment on the mobile device according to claim 16, wherein the driver includes a servo motor; and the controller includes a microcontroller unit (MCU).

* * * * *